United States Patent [19]

Iijima et al.

[11] 4,068,286
[45] Jan. 10, 1978

[54] OIL-IMPREGNATED POLYPROPYLENE CAPACITOR

[75] Inventors: Yasuo Iijima, Kobe; Tokihiko Shimizu, Takatsuki, both of Japan

[73] Assignee: Matsushita Electric Industrial Co., Ltd., Osaka, Japan

[21] Appl. No.: 717,743

[22] Filed: Aug. 25, 1976

Related U.S. Application Data

[63] Continuation of Ser. No. 562,414, March 27, 1975, abandoned, which is a continuation of Ser. No. 427,731, Dec. 26, 1973, abandoned.

[30] Foreign Application Priority Data

Dec. 27, 1972  Japan .................................. 47-3420

[51] Int. Cl.² .......................................... H01G 4/22
[52] U.S. Cl. .................................. 361/315; 252/64; 361/323
[58] Field of Search ............... 317/258, 257; 361/314, 361/315, 323, 327; 252/64

[56] References Cited

U.S. PATENT DOCUMENTS

| 2,410,714 | 11/1946 | Clark | 317/258 X |
| 2,935,668 | 5/1960 | Robinson | 317/258 |
| 3,363,156 | 1/1968 | Cox | 317/258 |
| 3,796,934 | 3/1974 | Munch | 317/258 |

FOREIGN PATENT DOCUMENTS

| 1,191,299 | 5/1970 | United Kingdom | 317/258 |

Primary Examiner—E. A. Goldberg
Attorney, Agent, or Firm—Stevens, Davis, Miller & Mosher

[57] ABSTRACT

An oil-impregnated capacitor comprising a thin insulator sheet solely consisting of a plastic film and impregnated with an insulating oil, the aptitude of which is defined by both the oil absorption and the expansion coefficient of the film.

2 Claims, 7 Drawing Figures

OIL-IMPREGNATED POLYPROPYLENE CAPACITOR

This is a continuation of application Ser. No. 562,414 filed Mar. 27, 1975 now abandoned which in turn is a continuation of application Ser. No. 427,731, filed Dec. 26, 1973 (now abandoned).

This invention relates to an oil-impregnated capacitor.

Insulating oils heretofore used for an oil-impregnated capacitor include mineral oil, alkylbenzene, polybutane, fluid paraffin and various ester oils. These insulating oils have been investigated for oil-impregnated capacitors using capacitor paper or craft insulation paper as a thin insulator sheet. Recently, they are also investigated for capacitors using a combination of the aforementioned insulation paper and a plastic film, and some of them are now actually used for such capacitors.

A plastic film has excellent electric properties, so that an oil-impregnated capacitor using the plastic film solely for its thin insulator sheet has been desired by those skilled in the art. However, it has been difficult to realize such a capacitor. One of the grounds for this is that it has been impossible to obtain desired performance with the heretofore employed insulating oils. In other words, an insulating oil qualified for the plastic film has been needed.

An object of the invention is to provide an oil-impregnated capacitor, whose thin insulator sheet is solely constituted by a plastic film impregnated with an insulating oil well suited thereto.

The oil-impregnated capacitor according to the invention has the following features:

1. It is free from formation of voids at elevated temperatures, so that it is steady and not prone to deterioration due to corona discharge.

2. High temperature treatment is possible in its manufacture, and which is very effective for bettering the performance through removal of the impurity and so forth.

3. It can meet all the desirous characteristics of the sole plastic film oil-impregnated capacitor, which is greatly beneficial in the industry.

The above and other objects, features and advantages of the invention will become more apparent from the following description when the same is read in conjunction with the accompanying drawings, in which.

According to the invention, the plastic film used as the thin insulator sheet is impregnated with an insulating oil, which can meet specified requirements for oil absorption in the film and extent of expansion of the film.

Figure 1:
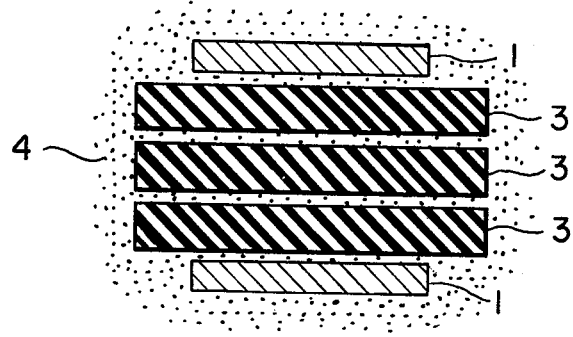
FIG. 1 is a pictorial view of an insulation structure of a model capacitor according to the invention.

The oil-impregnated capacitor according to the invention has a basic insulation structure as typically shown in FIG. 1. In the Figure, numeral 1 designates electrode metal foil (for instance aluminum foil), numeral 3 plastic film, and numeral 4 insulating oil with which the plastic film is impregnated.

The effects attainable according to the invention will be understood from the following experiments, upon which the invention is based.

EXPERIMENT 1

Figure 2:
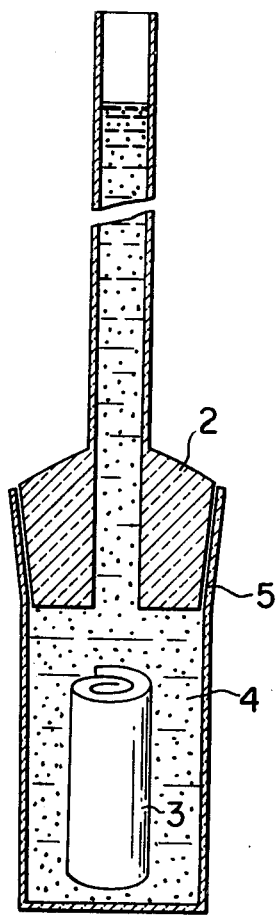
FIG. 2 is a schematic representation of a set-up for measuring the content of oil in film.
Figure 3:
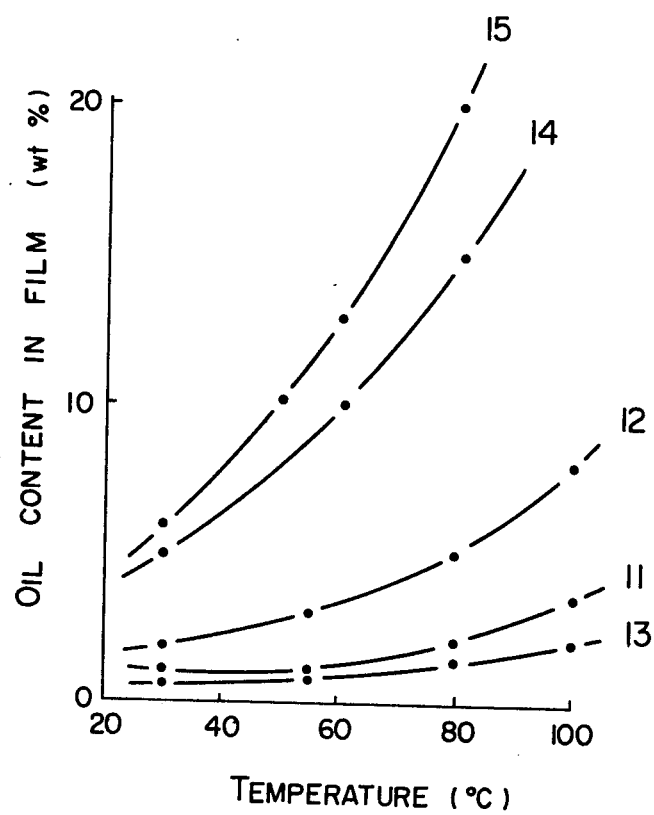
FIG. 3 is a graph showing the relationship between content of various oils in polypropyrene film and temperature.

The oil absorption in plastic film immersed in oil was measured for various insulating oils by using a set-up as shown in FIG. 2. In the Figure, numeral 5 designates a glass container, numeral 2 a glass plug cock with a graduated tube, numeral 3 a plastic film, and numeral 4 insulating oil. FIG. 3 shows the results of measurements made at various temperatures. In the Figure, curve 11 was obtained for diarylethane, curve 12 for alkylnaphthalene, curve 13 for dibenzyltoluene, and curve 15 for mineral oil. It will be seen from the Figure that the tested oils can be classed into two groups with respect to whether the absorption is below or above 10 weight percent. Particularly, marked distinction can be seen at temperatures higher than 60° C, more particularly between 80° and 100° C.

EXPERIMENT 2

Figure 4:
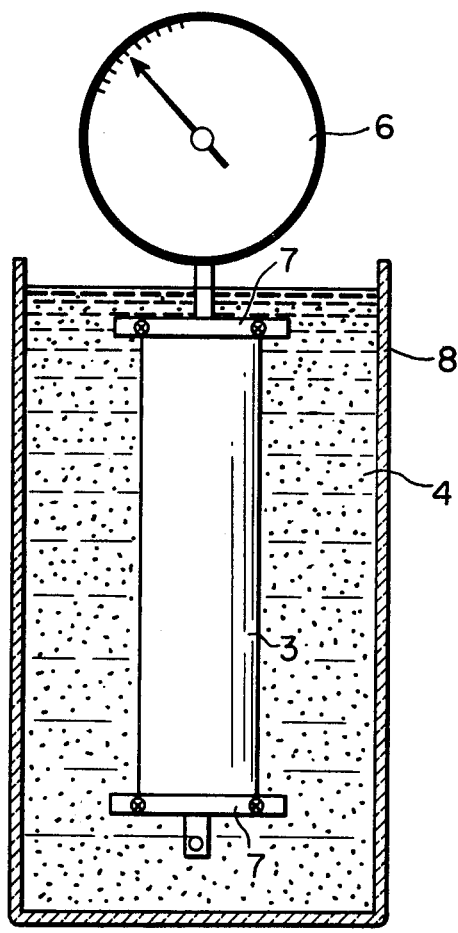
FIG. 4 is a schematic representation of a set-up for measuring the rate of expansion of film in oil.
Figure 5:
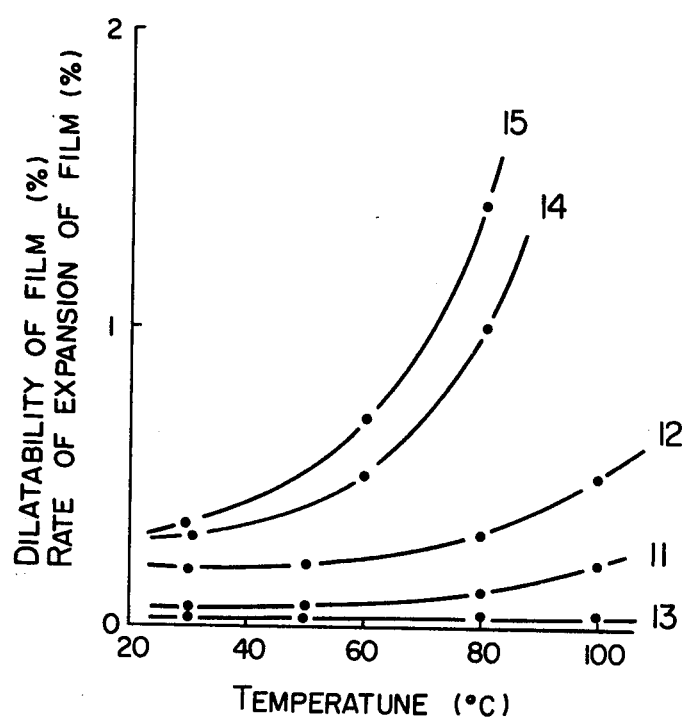
FIG. 5 is a graph showing the relationship between the rate of expansion of polypropyrene film in various oils and temperature.

The dilatability of polypropyrene film in various insulating oils was measured by using a set-up as shown in FIG. 4. In the Figure, numeral 3 designates the polypropylene film, numeral 4 the insulating oil, numeral 6 a dial gauge, numeral 7 means for holding the film under tension, and numeral 8 a transparent container. In the measurement, the film was held under a tension of 23 g/mm$^2$, which has no effect upon the expansion or contraction of the film. FIG. 5 whows the results of measurements. In the Figure, curve 11 was obtained for diarylethane, curve 12 for alkylnaphthalene, curve 13 for dibenzyltluene, curve 14 for alkylbenzene, and curve 15 for mineral oil. It will be seen that the tested oils can be classed into two groups depending upon whether the dilatability is below or above 0.5 percent. This distinction is possible at least at a temperature of 50° C and is pronounced at temperatures above 80° C.

EXPERIMENT 3

Figure 6:
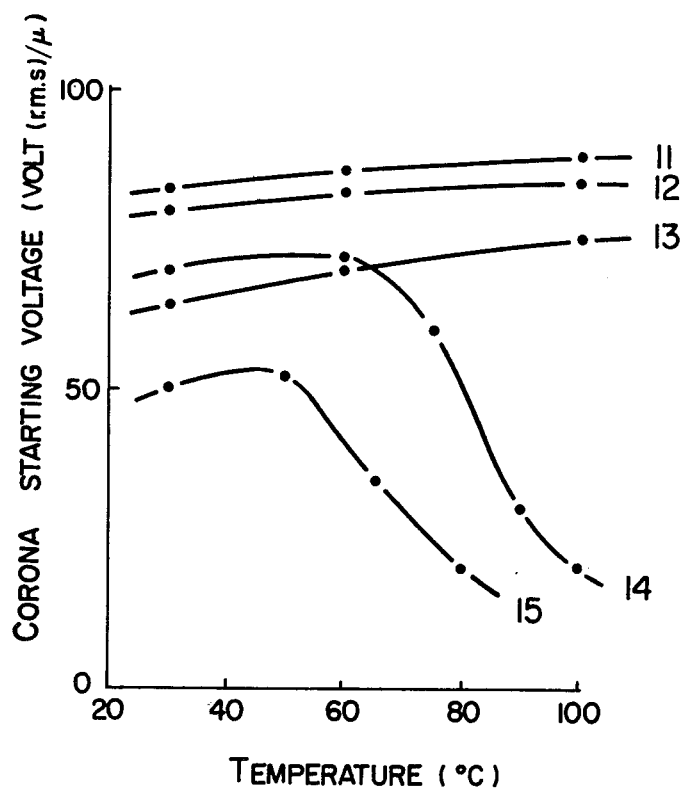
FIG. 6 is a graph showing the relationship between corona starting voltage of model capacitors impregnated with various oils and temperature.

The temperature dependency of the corona staring voltage was examined for model capacitors having the insulation structure of FIG. 1 and impregnated with various insulating oils. With some oils the corona starting voltage reduced with increasing temperature for temperature ranges above certain critical temperatures. In theis case, the critical temperature was above the temperature corresponding to absorption of 10 percent in the previous Experiment 1 and substally coincided with the temperature corresponding to dilatability of 0.5 percent in the previous Experiment 2. FIG. 6 shows the relationship between corona staring voltage and temperature of the model capacitors. In the Figure, curve 11 was obtained with diarylethane, curve 12 with alkylnaphthalene, curve 13 with dibenzyltluene, curve 14 with alkylbenzene, and curve 15 with mineral oil. The reduction of the corona starting voltage is presumably attributable to the generation of voids that would result from the diffusion of the oil from the interfilm gap into the film and vanishment of the oil pathe due to the compression of the interfilm gap because of a large rate of expansion of the film. This is supported even from oil impregnation experiments conducted with the roll of film alone, where interfilm voids could be clearly observed at elevated temperatures.

EXPERIMENT 4

Figure 7:
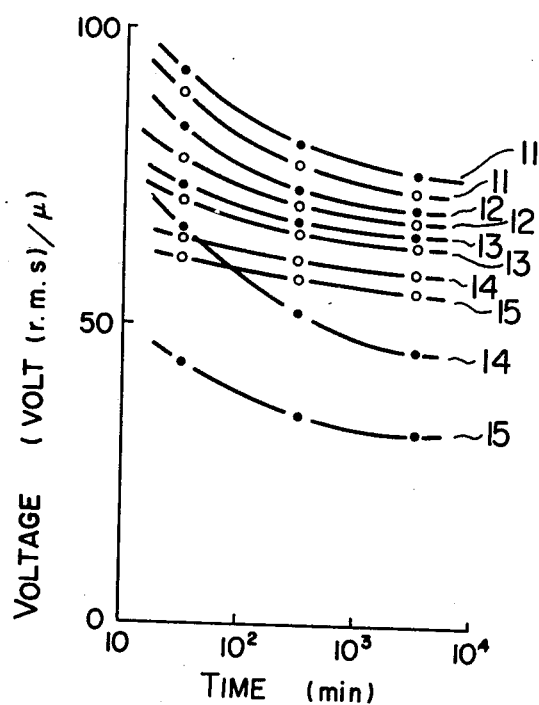
FIG. 7 is a graph showing the voltage versus time characteristics of model capacitors impregnated with various oils before and after heat treatment.

The effects of heat treatment of the same model capacitors as those used in the previous Experiment 3 or their voltage versus time characteristic was examined. The heat treatment was made at a temperature of 80° C for a period of 20 hours. FIG. 7 shows the results obtained. In the Figure, plots 11 were obtained with diarylethane, plots 12 with alkylnaphthalene, plots 13 with dibenzyltluene, plots 14 with alkylbenzene, and plots 15 with mineral oil. The plots with dots were obtained after the heat treatment, and the plots with circles before the heat treatment. It will be seen that with some capacitors the voltage versus time characteristic is improved by the heat treatment, while with the other capacitors it is deteriorated by the heat treatment. In case of the former capacitors the oil absorption at 80° C is below 10 weight percent, while with the latter capacitors it is above 10 weight percent, as is shown in connection with the previous Experiment 1. Also, with the former capacitors the rate of expansion at 80° C is less than 0.5 percent, while it is greater than 0.5 percent with the latter capacitors, as is shown in connection with the previous Experiment 2. Thus, it was found that in a high temperature range above 50° C the breakdown voltage characteristic of the latter capacitors extremely deteriorated due to the formation of voids or deformation of the capacitor elements.

While the polypropyrene film was used in the above Experiments 1 to 4, similar results were also obtained in similar experiments by using other plastic films such as polystyrene, polyester, polycarbonate and polysulfonate films.

An example of the capacitor manufactured for trial in accordance with the invention is given below.

EXAMPLE 1

A high voltage capacitor having the insulation structure as shown in FIG. 1 and voltage ratings of 6.6 KV and 100 KVA was produced. Diarylethane was used as the insulating oil, and polypropyrene was used for the plastic film. The average design potential gradient was 43 volts (r.m.s.)/$\mu$. The content of diarylethane in polypropyrene was 2% at 80° C and the rate of expansion was 0.1% at 80° C. This insulating oil could well provide satisfactory results over the working temperature range. This power capacitor is now being tested for its of continuous use for a period in excess of 10 thousand hours.

What we claim is:

1. An oil-impregnated capacitor comprising at least a pair of electrodes, at least one thin insulator sheet solely consisting of a polypropylene plastic film wound between said electrodes and impregnated with an insulating oil, said oil consisting essentially of an insulating oil having a physical property which allows the impregnated film to expand at 80° C by an amount no greater than 0.5 per cent over the unimpregnated film at room temperature and a physical property which allows said insulating oil to be present in the film at 80° C in an amount no greater than 10 per cent by weight of the film.

2. An oil-impregnated capacitor according to claim 1, wherein said insulating oil is selected from the group consisting of diarylethane, alkylnaphthalene and dibenzyltoluene.

* * * * *